United States Patent [19]
Gram

[11] Patent Number: 5,277,037
[45] Date of Patent: Jan. 11, 1994

[54] PLANT FOR PREPARING OVER-RUN EDIBLE ICE-CREAM

[75] Inventor: Klaus Gram, Vojens, Denmark
[73] Assignee: Brodrene Gram A/S, Denmark
[21] Appl. No.: 647,250
[22] Filed: Jan. 29, 1991
[30] Foreign Application Priority Data
  Feb. 1, 1990 [DK] Denmark .............. 0268/90
[51] Int. Cl.⁵ .............................................. A23G 9/00
[52] U.S. Cl. .................... 62/306; 73/861.35
[58] Field of Search ............. 62/306; 73/196, 861.38

[56] References Cited
U.S. PATENT DOCUMENTS

| | | | |
|---|---|---|---|
| 3,069,849 | 12/1962 | Crim | 73/196 X |
| 3,402,567 | 9/1968 | Menzel | 62/306 |
| 4,817,396 | 4/1989 | Menzel | 62/306 |
| 5,024,066 | 6/1991 | Goavec | 62/306 |

Primary Examiner—William E. Tapolcai
Attorney, Agent, or Firm—Watson, Cole, Grindle & Watson

[57] ABSTRACT

A plant for preparing over-run ice-cream includes a freezing apparatus for freezing mix supplied to the freezing apparatus via a feeding pump, an air supply apparatus for adding air to the mix before the mix is fed to the freezing apparatus, a mix mass flow meter for determining the mass flow rate of mix prior to addition of air, a computer which controls the air supply apparatus dependent upon the mix mass flow measured. The air is intimately mixed with the mix by means of a mixing apparatus arranged immediately before the freezing apparatus. The product in completely or partly melted condition has a cream-like thick consistency and an increased percent over-run.

3 Claims, 1 Drawing Sheet

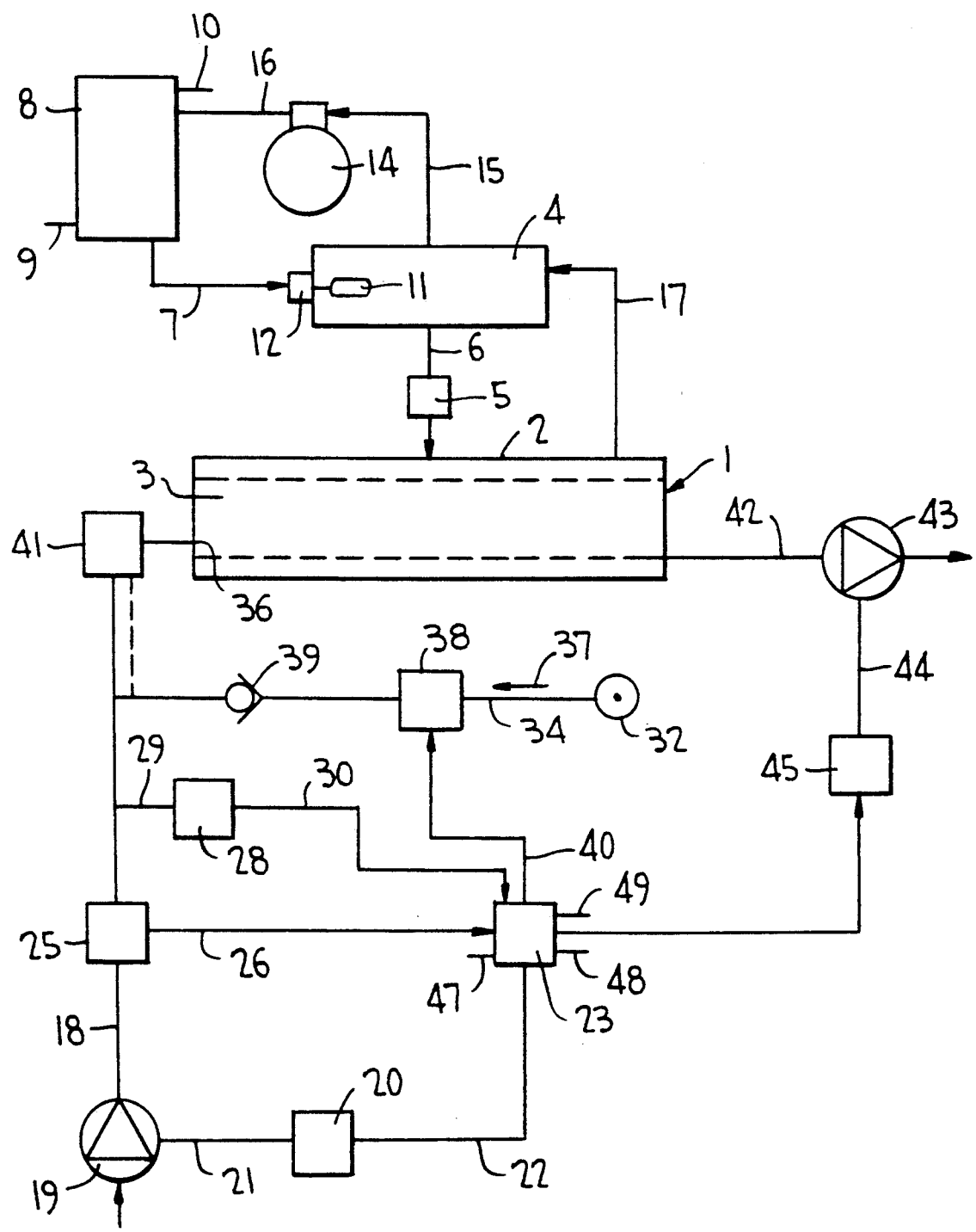

PLANT FOR PREPARING OVER-RUN EDIBLE ICE-CREAM

BACKGROUND OF THE INVENTION

The present invention relates to a plant for preparing over-run edible ice-cream, the plant comprising a completely or partly freezing apparatus for freezing an ice-cream mixture (mix), the freezing apparatus being fed with mix via a feeding conduit by means of a feeding pump, an air mass flow from a source of pressure air being added to the mix between the feeding pump and the freezing apparatus by means of an air supply apparatus, the air supply apparatus being controlled by means of a signal from a computer in such a way that the rate of the air mass flow depends upon the mix flow flowing through the feeding conduit, the mix flow being measured by means of a mix flow meter provided in the feeding conduit and connected with the computer.

A plant of the kind referred to above is disclosed in U.S. Pat. No. 4,747,272. According to this patent the mix flow through the feeding pump is measured by means of a volume flow meter, which delivers a signal directly proportional to the volume flow to the computer, which issues a signal that is directly proportional to the volume flow to the air supply apparatus in such a way that the air supply apparatus delivers an air mass flow to the mix in the feeding conduit that is directly proportional to the mix volume flow through the volume flow meter of the pump.

It should be mentioned that the ice-cream mixture to be used in the production of edible ice-cream, and which is here termed "mix", is mixed with air which is termed "over-run" in order to achieve a porous character of the final ice-cream. In order to freeze the air mixed (over-run) ice-cream mixture (mix) correctly, it is important that the percent over-run is correct, i.e., adjusted in the right way with respect to the composition of the mix and to the conditions prevailing during the freezing. The percent over-run is here defined as the the ratio between the weight of one volume mix (without air) multiplied by 100 and the weight of the same volume ice-cream from which ratio 100 is substracted.

Accordingly, it will be understood that if the mix after the over-run e.g. contains 50 volume percent mix and 50 volume percent air, the over-run is 100 percent and that the percent over-run will increase by increasing air addition and decrease by decreasing air addition.

A mix is prepared by mixing different ingredients known per se, and during such mixing also air will often be introduced into the mix. If the mix fed to the plant contains air and the volume flow rate of the mix is used in order to produce a signal directly proportional thereto for controlling the air supply as the case is according to the prior art referred to above, such air supply will be wrong because the air content in the mix will add to the control signal as if the air in question were mix.

This is unfortunate because a percent over-run which varies with respect to the one requested has a harmful influence upon the final product. This is due to the fact that the freezing apparatus is to be controlled in such a way that a requested viscosity of the product treated in the freezing apparatus is obtained and the parameters to be observed in this connection are in particular the pressure and the exit temperature. These parameters are adjusted according to the viscosity requested and a wrong percent over-run will not give the requested result by using operation parameters adjusted to another predetermined percent over-run. The result such wrong treatment is that the product, when it later on partly or completely melts displays a thin consistency.

It has been tried to improve the consistency of the final product when partly or completely melted partly or completely in connection with a freezing apparatus wherein the operating parameters thereof inclusive the percent over-run is controlled manually, viz. by mixing the mix and the air intimately with each other before the mixture is fed into the freezing apparatus. Thereby it has sometimes been possible to obtain a product having a cream-like consistency when completely or partly melted, but it has not been possible in this way to obtain good results in a reproduceable way. For instance, it has not been possible to achieve a product which always obtains the desired advantageous qualities. Presumably, this is due to the fact that previously it has not been realized that an exact observance of the percent over-run plays an important part for the final result. Moreover, it should in this connection be noticed that the factor used for controlling a manually controlled freezing apparatus is the viscosity of the material leaving the freezing apparatus and a previously determined viscosity may be achieved within a broad range of control both as regards the operating temperature and the pressure in the freezing apparatus, the exit temperature of the product, and the percent over-run, but such parameters must of course be mutually co-ordinated.

SUMMARY OF THE INVENTION

The basis of the present invention is the realization that an exact observance of the percent over-run is crucial in order to maintain an intimate mixing of the air in the mix in the final product in such a way that the product in question obtains the good conditions aimed at in a reproduceable way.

Accordingly, the present invention is characterized by the mix flow meter being a mix mass flow meter and by an apparatus for intimate mixing of the air into the mix being arranged in the feeding conduit. Hereby the desired percent over-run is achieved with high exactness because it is the mass flow (unit of mass per unit of time) which primarily controls the air supply. Of course the mass of the air, which may be included in the mix when the mix is fed to the feeding pump, adds to the mass flow of the mix, but this addition is negligible due to the small density of air as compared with the density of the mix. In other words, the computer primarily arranges for the air supply to be directly proportional to the mix mass flow through the feeding pump. Thereby errors will still occur if the mix fed to the plant contains air, but due to the fact that this air no longer adds to the control signal of the air supply apparatus, it is avoided that an air content, if any, in the mix supplied increases the air supply and, accordingly, increases the error. Simultaneously, such exact observance of the over-run results in that the intimate mixing of the air into the mix obtained by means of the mixing apparatus is maintained during the treatment of the product in the freezing apparatus and even after the product has been partly or completely, which is proven by the fact that the melted product displays a cream-like thick consistency. Moreover, it has been proven that a percent over-run higher than previously possible may be used.

As regards the prior art, reference should also be made to U.S. Pat. No. 2,530,981, which discloses that it is known to measure the densities of the mix before the air is added and after the mix has passed through the freezing apparatus of the plant and to use the difference between the two densities for controlling the air supply. However, such continuous measuring of the densities in question are difficult due to the high viscosity of the mix both before and in particular after the freezing apparatus and, accordingly, is connected with a considerable uncertainty.

According to the present invention it has been proven that the best results are achieved if the mixing apparatus is arranged immediately before the freezing apparatus.

The invention will hereinafter be further explained with reference to the accompanying FIGURE.

The plant shown in the FIGURE for preparing over-run ice-cream comprises a completely or partly freezing apparatus 1 for freezing an ice-cream mixture which in the following is termed "mix". The freezing apparatus 1 is of a kind known per se and, accordingly, no further explanations should be necessary. However, it should be mentioned that it comprises a jacket 2 which surrounds a cooling chamber 3 wherein the mix is cooled or frozen while being stirred by means of a motor-driven dasher. The expression completely or partly frozen in this specification is used due to the fact that the mix does not have any well defined freezing point and the degree of cooling or freezing depends upon the treatment to which the mix is to be subjected later on, which treatment may comprise a tapping-off of portions of the ice-cream followed by a freezing or a final freezing.

The jacket 2 is fed with a refrigerant from a liquid separator 4 via an expansion valve 5 inserted in a conduit 6 which is connected with the jacket 2 at the bottom. The liquid separator 4 is supplied via a conduit 7 with liquid refrigerant from a condenser 8 which in the example shown is cooled by means of a cooling liquid passing through the condenser 8 via an inlet 9 and an outlet 10. The liquid separator 4 is provided with a valve 12 controlled by means of a float 11 in such a way that a constant level of liquid refrigerant may be maintained in the liquid separator 4. Moreover, the liquid separator 4 serves as a suction space for a compressor 14 connected with the liquid separator 4 by means of a suction conduit 15 and with the condenser 8 by means of a pressure conduit 16. The suction space of the liquid separator 4, moreover, is connected with the jacket 2 of the apparatus 1 at the top via a suction conduit 17.

The mix is fed to the freezing apparatus I via a mix feeding conduit 18 by means of a pump 19, e.g. a gear pump, fed with a positive inlet pressure from a plant known per se for the preparing of the mix. The pump 19 is controlled by means of a pump controller 20 via a control wire 21 and the controller 20 is via a control wire 22 connected with a computer 23. Downstream of the pump 19 a mass flow meter 25 is inserted in the mix feeding conduit 18 and, accordingly, the meter 25 measures the mix flow flowing through the conduit 18 in unit of mass per unit of time. By means of a con 26 the mass flow meter 25 is connected with the computer 23. Downstream of the mix mass flow meter 25 a pressure transducer 28 is connected to the mix feeding conduit 18 via a conduit 29 and the pressure transducer is connected with the computer 23 via a control wire 30.

In order to over-run the mix, air or another gas is added to the mix. According to the example shown, the plant operates with air and, accordingly, this gas only will be mentioned in the following. The air is added from an air supply apparatus 31 comprising a pressure air source 32. The air supply apparatus 31 is by means of an air feeding conduit 34 connected with the mix feeding conduit 18 between a position 36 at which the mix feeding conduit is connected with the inlet end of the freezing apparatus I and the position at which the mix feeding conduit 18 is connected with the transducer 28.

As seen in the direction of flow of the air, cf. the arrow 37, an air mass flow controller 38 is inserted in the air feeding conduit 34 and between the controller 38 and the mix feeding conduit 18 a one-way valve 39 is inserted, which prevents the air from flowing against the direction of the arrow 37. The air mass flow controller 38 is by means of a control wire 40 connected with the computer 23.

Immediately upstream of the connecting position 36 a mixing apparatus 41 is inserted in the mix feeding line 18. The mixing apparatus is adapted for creating an intimate mixing of the air into the mix. It should be noticed that according to the construction of the mixing apparatus, it may be connected as shown in full lines or it may be connected directly with the air feeding line 34 as indicated by a broken line. The first arrangement is used if the mixing apparatus is a flow-through mixer, whereas the latter arrangement is used if the mixing apparatus comprises an inlet for each of the two fluids, mix and air, to be mixed.

Appropriately the apparatus 41 is an apparatus which mixes primarily by means of a shearing action due to co-operating rotors. As an example, mixing apparatus known under the trademark "Mondomix®" may be mentioned.

The mix mixed with air, i.e. over-run mix, leaves the freezing apparatus 1 through an outlet conduit 42 wherein an outlet pump 43 or another kind of a pressure maintaining device, e.g. a control valve, is inserted. From the exit pump 43 the mix is conveyed for further treatment, e.g., to machinery for tapping-off the over-run and cooled/frozen mix. The exit pump 43 is via a control wire 44, wherein a pump controller 45 is inserted, connected with a computer 23.

The computer 23 comprises an adjustable adjusting point, viz. a set point 47, for adjusting the plant according to the desired capacity (liter mix per hour) and, accordingly, the mass flow meter 25 measures the corresponding mass flow (kg per hour) and this information is fed to the computer 23. Previously, data of the mix in question have been inserted in the computer 23 and, accordingly, the computer also knows the density of the mix in question. Based upon such data the computer calculates the mix volume flow corrected for air content, if any. In other words, if the mix fed to the plant does not contain air, the mix volume flow calculated will be the same as the volume flow adjusted by means of the set point 47 whereas the mix volume flow calculated, if the mix contains air, will be correspondingly lower. Due to the fact that the computer now knows the nominal volume flow of the mix, i.e. without air, the computer also knows what air volume is to be introduced into the mix by means of the air supply apparatus 31 depending upon what percent over-run the final ice-cream shall have. The percent over-run desired is adjusted by means of another set point 48. In this connection it should be mentioned that by the term "percent over-run" the ratio between the weight of a volume mix without air multiplied by 100 and the mass of the same volume of mix after over-run minus 100 should be understood. In the present case it is assumed that an over-run of 100 percent is desired, i.e. one volume unit over-run mix, which leaves the apparatus, should contain half a volume unit mix and half a volume unit air. Accordingly, the set point 48 is adjusted to 100 and now the computer knows that the air supply apparatus 31 should supply the same volume of air per unit of time as the corrected volume of mix per time which the computer 23 has calculated. Now the computer converts the volume of air to be supplied per unit of time into air mass per unit of time and controls the air mass flow controller 38 correspondingly.

The computer 23 comprises a third set point 49 which serves to adjust the pressure at which it is desired to freeze and, accordingly, the volume flow, which the exit pump 43 permits, depends upon the adjustment of this set point. It will be understood that the pressure at which the frezing apparatus 1 will operate will depend upon the ratio between the capacities of the two pumps 19 and 43 and, accordingly, the pressure in the freezing apparatus 1 may be controlled by adjusting the capacity of the pump 43. The same result may be achieved by any other kind of pressure maintaining device. In order to observe the pressure in the freezing apparatus the plant is provided with the pressure transducer 28 previously referred to, which senses the pressure in the feeding line 18 before the inlet to the freezing apparatus. If the pressure transducer 28 senses a pressure which differs from the pressure requested, the computer controls the number of revolutions of the exit pump or the pressure maintaining device by means of the pump controller until the pressure requested has been re-established.

It will be understood that the plant shown is provided with further controls, viz. for controlling the capacity of the freezing apparatus 1, in such a way that the complete or partly freezing of the mix supplied and, accordingly, the requested viscosity of the issueing mix, is achieved. Of course such control features may also be built into the computer 23 in such a way that the viscosity of the mix leaving the freezing apparatus 1 is as requested. This viscosity is measured by measuring the power consumption of the motor, which drives the dasher, because the resistance against stirring is directly proportional with the viscosity.

Due to the fact that the air supply as explained above depends upon the mix mass flow supplied, the air supply will be independent upon whether the mix contains a smaller or greater quantity of air. Truly, such quantity of air will still be present in the final mix further to the air supplied, but this error is very small because the original content of air in the mix has not added to the air supply in the plant.

Due to the very exact control of the over-run which results from the exact control of the air supply, combined with the exact observance of the viscosity of the mix treated in the freezing apparatus, it is achieved that the intimate mixing of air into the mix obtained by means of the mixing apparatus is maintained during the treatment in the freezing apparatus and, accordingly, also in the final product and, furthermore, also after complete or partly melting of the product in such a way that the final product to a high degree has a cream-like thick consistency.

I claim:

1. In a plant for producing over-run edible ice cream which includes a freezing apparatus for partly or completely freezing an over-run ice cream mix, a feeding conduit connected to said freezing apparatus, a pump in said feeding conduit, a first supply conduit connected to said feeding conduit for supplying an initial viscous ice cream mix which may contain air to said feeding conduit, a flow meter in said feeding conduit for measuring flow of said initial ice cream mix, means providing a source of over-run gas, a second supply conduit connecting said over-run gas means to said feeding conduit between said flow meter and said freezing apparatus to supply over-run gas to said initial ice cream mix, a computer connected to said mix flow meter, and a mixing apparatus in said feeding conduit for mixing said initial ice cream mix and said over-run gas to form an over-run edible ice cream mix supplied to said freezing apparatus, the improvement wherein said mix flow meter is a mix mass flow meter, such that any effect of air in the initial ice cream mix is reduced.

2. A plant according to claim 1, wherein said mixing apparatus is located immediately upstream of said freezing apparatus.

3. A plant according to claim 1, including a controller in said second feeding conduit to control the flow of gas into said feeding conduit and a control line connecting said computer to said controller.

* * * * *